United States Patent
Chybin et al.

(10) Patent No.: US 6,530,983 B2
(45) Date of Patent: Mar. 11, 2003

(54) SYSTEM FOR THE CONDUCTION OF LIQUID MEDIA, AS WELL AS FILTERING DEVICE FOR USE IN SUCH A SYSTEM

(75) Inventors: Dieter Chybin, Kapfenberg (AT); Rudolf Christian, Graz (AT); Klaus-Christoph Harms, Graz (AT)

(73) Assignee: AVL List GmbH, Graz (AT)

(*) Notice: Subject to any disclaimer, the term of this patent is extended or adjusted under 35 U.S.C. 154(b) by 0 days.

(21) Appl. No.: 09/748,363

(22) Filed: Dec. 26, 2000

(65) Prior Publication Data

US 2001/0015135 A1 Aug. 23, 2001

(30) Foreign Application Priority Data

Dec. 30, 1999 (AT) ................................ 921/99

(51) Int. Cl.$^7$ .............................................. B01D 19/00
(52) U.S. Cl. ...................... 96/165; 96/175; 96/179; 96/193; 96/219; 210/188
(58) Field of Search .................... 95/30, 241, 254, 95/260, 243; 96/165, 175, 179, 180, 219, 193; 210/188

(56) References Cited

U.S. PATENT DOCUMENTS

| | | | | |
|---|---|---|---|---|
| 1,804,557 A | * | 5/1931 | Gould et al. | |
| 2,363,247 A | * | 11/1944 | Holder | |
| 2,392,901 A | * | 1/1946 | Brown | |
| 2,742,049 A | * | 4/1956 | Granberg | |
| 3,127,255 A | * | 3/1964 | Winslow | |
| 3,283,477 A | * | 11/1966 | Kasten | |
| 3,608,272 A | * | 9/1971 | Di Peri et al. | |
| 4,336,037 A | * | 6/1982 | Goldis et al. | |
| 4,707,165 A | * | 11/1987 | Tauber et al. | |
| 5,429,595 A | * | 7/1995 | Wright, Jr. et al. | |
| 2001/0015135 A1 | * | 8/2001 | Chybin et al. | |

FOREIGN PATENT DOCUMENTS

| | | |
|---|---|---|
| DE | 3843934 | * 6/1990 |
| DE | 3844060 | * 7/1990 |
| DE | 40 02 594 A1 | 8/1991 |
| EP | 0 226 405 A2 | 6/1987 |
| JP | 5-96103 | * 4/1993 |

* cited by examiner

Primary Examiner—Duane S. Smith
(74) Attorney, Agent, or Firm—Sonnenschein, Nath & Rosenthal

(57) ABSTRACT

The invention relates to a system for the conduction of liquid media, for example fuels, between a tank and a delivery point, especially fuel consumption measuring systems or fuel conditioning systems, which includes a bubble-separating arrangement, as well as a filter element for use in such a system. For the simple and effective detection and separation of bubbles and further contaminations of every type in the particular liquid medium and, if necessary, the further development for additional simple and rapid determination of their volumes and therewith consideration in possible measurements, it is provided that the bubble-separating arrangement is formed by a filtering device and in the filtering device the connection for the liquid medium is arranged in a zone outside the filtering element.

23 Claims, 1 Drawing Sheet

SYSTEM FOR THE CONDUCTION OF LIQUID MEDIA, AS WELL AS FILTERING DEVICE FOR USE IN SUCH A SYSTEM

BACKGROUND OF THE INVENTION

The invention relates to a system for the conduction of liquid media, for example fuels, between a tank and a delivery point, especially fuel consumption measuring systems or fuel-conditioning systems, that comprises a bubble-separating arrangement, as well as a filtering element for use in such a system.

In many systems for the transport and for the conduction of liquid media, especially in fuel consumption measuring systems or fuel conditioning systems, gas bubbles in the liquid have a strong influence, especially on the accuracy of the consumption measuring values or on the accuracy of the metering of the mass flow of the liquid. Accordingly, gas bubbles that move stochastically through the system are absolutely undesired, since, for example, they decisively negatively influence the consumption measurement values by their volume change with pressure gradients. The tracking-down and possible separation of gas bubbles, however, is associated with many difficulties. Thus the site in the whole system where the bubbles preferably manifest themselves and would collect is not exactly definable by reason of very diverse components such as filters, valves, pumps, pressure-reduction valves, but is dependent on the particular installation. Also, the detection of the bubbles themselves involves many difficulties. Usually, optical processes with trans-radiation of the liquid are used, in which case, however, the weakening or dimming of the transmitted light caused by the bubbles is influenced by various interfering factors, for example by the bubble diameter, the bubble concentration, the color and turbidity of the liquid and other such factors.

In the fuel delivery system of EP 0 226 405 A2, proceeding from a state of the art in which the liquid is conveyed through a filter by means of a pump, and in which, in a space engaged after the filter, the contained air rises by action of gravity and can be separated off there, a solution is proposed in which the centrifugal forces of a blade pump are utilized. The heavier fuel is pressed radially outward, while the lighter air bubbles remain closer to the axis of rotation of the pump and are transported away in an axial direction.

On the basis of a gravity force separator without filter unit and in the form of an annular chamber, the gasoline pump of DE 40 02 594 A1 brings about a separating of the fuel from carried-along gases. Also the fuel delivery system described in U.S. Pat. No. 5,884,809 uses a centrifugal air separator in order to remove from the liquid, before delivery, the gases present in the fuel.

SUMMARY OF THE INVENTION

The aim of the present invention, therefore, is a system, and a filter element, for the simple and effective detection and separation of bubbles and other impurities of every type in the particular liquid medium and, if necessary, the further development for the additional simple and rapid determination of their volumes and therewith of their consideration in necessary measurements.

For achieving the above-mentioned aim, a system according to the invention is provided where the bubble-separating arrangement is formed by a filtering device. Therewith, all the difficulties with the optical detection of bubbles are avoided and a volume and mass flow, no longer influenceable by possible pressure gradients in the system, is achieved at a point determined according to an installation site of the separating arrangement in the system, preferably at the point of a consumption measurement. Through this arrangement there is achieved, besides the separation/precipitation of carried-along solids and particles, also in a simple and dependable manner, a separation of the gas bubbles present in the medium, which bubbles by reason of their surface tension, present a higher resistance than the liquid itself to the passage through a filter medium and therefore remain adhering to the filter surface. According to the flow state then they move onward. In the ideal case the bubbles ascend at their bubble-rising rate and can in this manner be collected. There comes about then, furthermore, a bubble coalescence, i.e., a combining of bubbles and a formation of larger gas bubbles or, respectively, of a gas volume.

Preferably there is provided a bubble collecting volume/space standing in communication with the bubble separating arrangement, so that in it the rising bubbles can be collected in a simple and uncomplicated manner, and their volumes can be determined.

If the bubble collecting volume is arranged above, preferably directly above, the bubble separating arrangement, complicated transport lines and arrangements for the gas volume formed can be avoided. The movement of the gas bubbles occurs solely by reason of the physical conditions and, accordingly, without additional expenditure of energy.

The consideration of the volume of gas separated from the liquid medium for possible measurement value corrections is possible in a simple manner if, according to a further feature of the invention, there is provided a filling-state display arrangement for the volume of bubbles collected.

In order to assure a continuous operation of the system and to not have to provide for any interruptions when the bubble-collecting volume is completely filled, advantageously there is present a preferably automatic bubble-removing system, for the bubble collecting volume, preferably connected with the filling-state display device.

If the outlet of the, air/gas-removing device is provided with a return line into the system, preferably with a possible tank, then, one the one hand, the environment is spared, since liquid vapors contained in the gas volume cannot be given off into the environmental air.

Preferably, and in a proven and dependable manner, there can even occur a recovering of the liquid vapors by means of a separating device provided for the liquid vapors in the return line proceeding from the bubble separating arrangement. These separating devices can be formed as adsorption filters with, for example, silica gel in the gas-removal line or also by, for example, a vapor condenser, such as a cooling trap, directly in the bubble separation arrangement, the latter solution offering the advantage that condensed liquid vapors are returned back to the same place from which they were taken.

According to a further feature of the invention, there is provided at least one arrangement for the manifesting of latently present bubbles, for example a sharp edge against which the liquid flows. Thereby, especially by the locally high flow velocities and pressure gradients at the edge, it can be achieved that, depending on the pressure and temperature of the liquid, the gases present partly as solution and partly as bubbles of different size, actually make an appearance, and therewith there occurs the formation of separate and therewith also of troublesome gas bubbles preferably at a defined place, preferably immediately before the bubble separating arrangement and not uncontrollable in an arbitrary place of the system.

According to a further feature of the invention an ultrasound acoustic irradiation device is provided in front of or in the bubble separating arrangement. Therewith the manifestation of the gas bubbles, by reason of high pressure amplitudes and therefore of high pressure gradients, can be achieved with relatively low sonic performance if only the sonic field has a corresponding standing wave constituent, which can be assured by the use of sound reflectors and/or sound converters. The effect of the sonic field occurs there not only locally, but very efficiently, in the entire sound-irradiated liquid volume. Further, the sound irradiation offers the important advantage of producing the bubble coalescence, since the bubbles are driven against one another by the sonic forces acting in the like-amplitude planes of the sound field, so that they finally come in contact and join into larger bubbles that rise easily and can be separated.

In order to bring about, as unimpeded as possible, a rapid and therewith complete rising of the bubbles, the sonic irradiation device is advantageously oriented in such manner that the spreading direction of the ultrasound is essentially horizontal. The planes of like sound-field amplitude, there, are oriented essentially vertically and with substantially horizontal flow, purposefully parallel to the flow direction. A gas bubble rising in consequence of gravity will not leave the plane in which it was formed by the pressure gradients, and it is held fast in this plane by the sound forces and can, therefore, rise all the more easily. In this context let it be mentioned, further, that the sound field can also be used in a manner known per se to transport the bubbles in a desired direction. With horizontal flow direction of the liquid medium or a flow direction running from below upward, this promotes, in addition, the ascent of the bubbles into the separating arrangement.

For achieving the aim of the present invention there is also well suited a filtering device which is meant for use in a system according to one of the preceding paragraphs and that comprises a filter housing with a filtering element located in it and traversed by the liquid medium, the filtering surface of which, against which the still-unfiltered medium flows, encloses with the perpendicular, or vertical, an angle not equal to 90° and is preferably parallel thereto. According to the invention, this filtering device is characterized in that the connection for the liquid medium is oriented in a zone outside of the filtering element. Therewith, the entry impulse of the flow of the liquid medium can be decomposed to such an extent, and the flow modified in such manner, that gas bubbles present in the medium, by reason of their surface tension oppose a resistance to their passage through the filter element such that they cannot be pressed through the filter surface by the liquid medium, and remain adhering to this surface. According to the flow state, they then move onward through the filter element transversely to the flow of the medium; in the ideal case the bubbles rise at their bubble ascension speed and can thus be collected, in which case, moreover, there can occur a coalescence of bubbles. This rising is facilitated, to the best possible extent by an, insofar as possible, vertical alignment of the filter surface. In their rising along an essentially vertically oriented filter surface there optimally occurs the coalescence of the bubbles, which further facilitates the separation.

According to advantageous further feature of the invention, the connection is provided in the lowest range of the filtering device, preferably underneath or below the filter element. Therewith there is ensured to a still greater extent the homogenization of the flow before its passage through the filter element, and there is prevented the possibility that substantial velocity components are present in the direction toward the filtering surface.

If the filter element is constructed as an essentially annular or hollow-cylindrical body, the filtering surface of which lies on the mantle or outer circumference of the ring or hollow cylinder and the axis of which encloses with the perpendicular or vertical a preferably acute angle, and in particular is aligned parallel thereto, it is possible to resort to proven and economically producible components, and the expenditure for the improvement of the system for which the filtering device is intended can be kept low. Moreover, a filtering element built in this way offers an optimal relation of traversed filtering surface to construction volume.

Advantageously it is provided there that the connection is arranged with radial spacing to the filter element or to the axis of this, which further improves the homogenization of the flow and the elimination of velocity peaks, especially in combination with an arrangement of the connection also underneath the filter element.

Advantageously with low manufacturing expenditure and compact construction of the device there is worked out in the filter housing above the filter element a hollow space as a bubble-collecting volume, and this is connected with the space containing the filter element.

A device having the least space requirement and the simplest construction, here, is one in which according to a further inventive feature, the hollow space is constructed as a bulging or enlargement of the space containing the filter element. Also, through the close spacing of filter element and collecting space, there is assured the rapid and direct removal of the bubbles.

In order to make it possible to perceive the volumes of the precipitated bubbles, to make it possible to draw upon the amount of these volumes, if need be, for the correction of measurement values in the system, and also to detect a complete filling of the collecting space with bubbles, which state makes necessary an intervention for the further orderly operation, the filter device advantageously is characterized by a filling-state display arrangement in or in connection with the hollow space.

If a gas-bubble removing opening preferably provided with an automatic ventilating device for the hollow space is present, an interruption-free operation of the filtering device, and therewith also of the system, can be ensured by a case-wise emptying of the collecting space for the gas bubbles. If the gas-bubble removing device, there, also continues to operate automatically, advantageously controlled directly or indirectly over the filling state display arrangement, then the interruption-free operation can be assured, also without necessary interventions by the operator or the user.

BRIEF DESCRIPTION OF THE DRAWINGS

In the following specification the invention is to be explained in detail with the aid of an example of execution and with reference to the attached drawing.

DETAILED DESCRIPTION OF THE PREFERRED EMBODIMENTS

Figure 1:
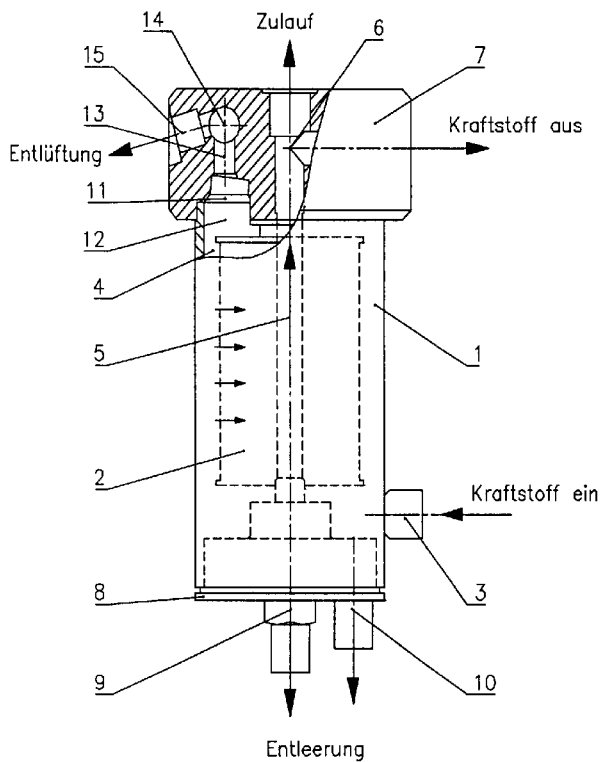
FIG. 1 schematically shows a filtering device according to the invention as a bubble-separating device.

In a housing 1 of the filtering device of the invention represented in FIG. 1, which can be used as a bubble separating arrangement in a system for liquid media, a filter element 2 is arranged. This filter element 2 is constructed, with a favorable ratio of traversed-filter surface to construction volume, as an upright-standing hollow cylinder through, in a manner known per se, the liquid flows from the outside inward. The traversable filter surface extends there, for example, flat, corrugated or in fold form, preferably over the entire surface of the mantle or outer circumference of the filter cylinder, and upper and lower cover surfaces serve for the holding-together and the handling of the filter element 2. The liquid, for example fuel in the case of fuel-consumption measuring systems or the like, fills an outer essentially annular chamber 4 surrounding the filter element 2, it flows through the filter element 2 transversely to its essentially vertically standing axis, then flows upward along this axis in a central passage 5 of the hollow cylindrical filter element 2, and exits through a passage 6, consisting of a bore in a head 7 of the filter housing 1 in an extension of the central passage 5 and through a connecting bore running essentially perpendicular thereto and a further connecting element (not represented), again filtered and freed from gas bubbles. At a bottom 8 of the filter housing 1 there are further provided connections 9, 10 for the emptying of the filtering device.

The connection 3 is arranged and/or aligned in such a manner that the flow of the liquid medium does not strike directly on the filter surface of the filter element 2, but is aimed at a zone outside of this filter surface. Thereby there is surely avoided the possibility that gas bubbles will be pressed by the liquid stream through the filter surface, and it is assured that they can be separated as described as follows below. Preferably the connection 3 is arranged underneath the filter element 2 and oriented perpendicularly to the filter axis so that the liquid medium also enters the filtering device at an angle of 90° to the filter axis, beneath the filter element 2 proper, with a breakdown of the entry impulse, homogenization, and also a breakdown of flow velocity peaks.

The gas bubbles that remain adhering to the outer filter surface of the filter element 2 rise along the filter element 2 and collect into a bubble-collecting volume 11 that is defined by a hollow space formed in the head 7 of the housing 1, which hollow space preferably follows immediately upon the installation space for the filter element 2 and lies essentially vertically above the outer chamber 4. For the collecting of bubbles over the entire circumference of the filter element, and on at least one part of its circumference, the collecting volume 11 advantageously consists of the filter element 2, of an annular zone 12 immediately above the filter element and, on at least one point of its circumference, of an extension 13 which extends longitudinally upward. In the collecting volume 11, for example in a measuring chamber 14 provided all the way at the top of the extension 13, there is provided a filling state sensor which makes evident automatically, or on interrogation, what part of the collecting volume 11 is already filled with gas from the filtered liquid. As possible measuring systems for the level measurement in the collecting volume 11 there can be used the most diverse range of sensor systems, preferably those with low structural height, for example which use optical, capacitive or thermal processes.

This filling-state sensor is advantageously connected with a gas-bubble removing device, either directly or over a central evaluating unit, which gas-bubble removing device, preferably automatically as needed, draws the gas collected in the collecting volume 11 over the gas-bubble removing opening 15 and preferably returns it into the system. Therewith, for example, in fuel systems, the fuel vapors contained the gas cannot pass into the environmental air and can even be recovered. This can be achieved by use of adsorption filters or also by use of vapor condensers, for example a cooling trap, directly at the filtering device. It proves especially advantageous to arrange any condenser upstream of the valve of the gas-bubble removing device, therefore still in the region of the liquid system, and preferably to construct it with a small, strongly cooled drop-off place in the head 7 of the filter housing 1, where the gas bubbles collect. In this manner, vapors can condense continuously and be returned continuously into the system. As a cooler, there can be used advantageously a Peltier element.

Instead of a level measurement with controlled gas-bubble removal there can also be used, with a simpler form of execution, an automatic gas-bubble removing system with, for example, a float valve. In this arrangement is to be heeded that the change in the volume of the liquid, brought about by the gas-bubble removal taking place automatically and at random, either remains without effect on possible measurement values for consumption measurements, for example, or is sufficiently taken into account. This can be achieved by a determination of the opening and closing movements of the gas-bubble removal valve.

Advantageously, besides the circuitry components can also be provided alternatively or additionally, or components present in any case can be constructed in such manner that latently present gas bubbles also actually make an appearance. For example, sharp edges against which the liquid flows preferably shortly before reaching the filter element 2, can lead to locally high flow speeds, therewith to high pressure gradients, and thus lead to the manifestation of the gas bubbles.

Figure 2:
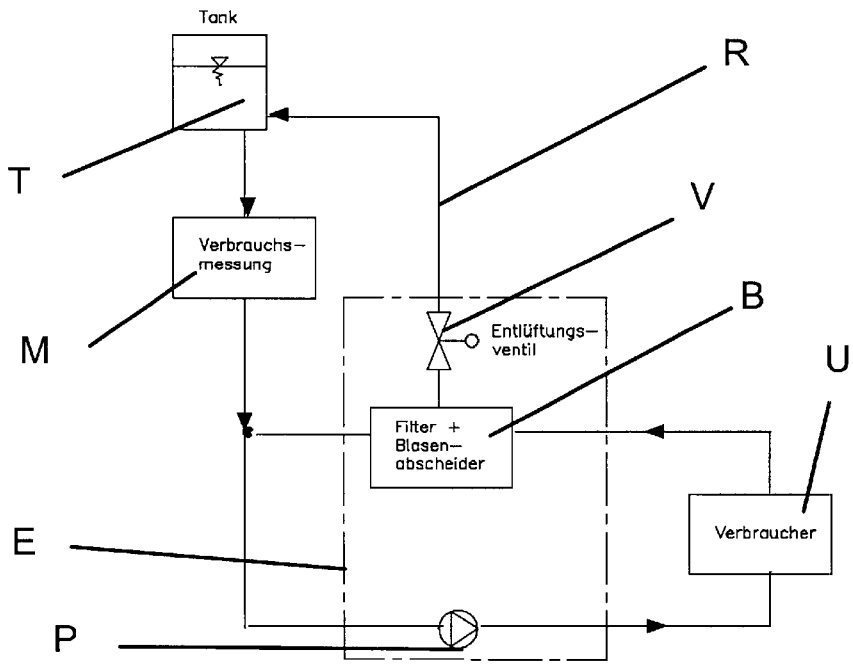
FIG. 2 is a schematic system sketch for the inventive arrangement of the bubble separating device.

In FIG. 2 there is represented a system according to the invention for the conduction of liquid media, here in particular fuel, between a tank T and a delivery point to a fuel consumer U. There, a measuring point M, in principle constructable in any arbitrary manner, is provided and installed in the system, in flow direction and preferably directly downstream of the tank T. Between the consumption measurement point M and the delivery point to the fuel consumer U there is now located, according to the present invention, an arrangement E which is provided with a bubble-separating arrangement B for the achievement of a volume or mass flow of the fuel at the consumption measuring point M, that is independent from the pressure gradients in the system. This separating arrangement is preferably constructed in the form of the filter represented in FIG. 1. Over a return line R, preferably issuing into the tank T, the gases drawn off over a ventilation valve V of the gas-separating arrangement B, and/or the fuel components contained therein and preferably already separated, are returned into the system. The transport of the fuel in the system is brought about by a pump P, which is advantageously integrated into the arrangement E.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as my invention:

1. A system for the conduction of a liquid fuel, between an inlet and a delivery point, said system comprising at least one of a fuel consumption measuring system and a fuel conditioning system, said system further including a bubble separating arrangement, wherein the bubble separating arrangement is formed by a filter device.

2. A system according to claim 1, further including a bubble collecting volume arranged in communication with the filtering device.

3. A system according to claim 2, wherein the bubble collecting volume is arranged above the filtering device.

4. A system according to claim 3, wherein the bubble collecting volume is arranged directly above the filtering device.

5. A system according to claim 2, further including a filling-state display arrangement for the bubble collecting volume.

6. A system according to claim 5, further including a bubble-removing device that is automatic and is connected with the filling-state display arrangement for the bubble collecting volume.

7. A system according to claim 6, wherein an outlet for the bubble-removing device is connected with a return line into the system.

8. A system according to claim 7 further including a tank connected to the outlet for receiving the removed bubbles.

9. A system according to claim 8, wherein a condensation device is provided in a return line, the return line extending between the filtering device and the tank.

10. A system according to claim 1, including a conduit through which the liquid flow between the inlet and the delivery point, wherein a structure including a sharp edge is positioned in the conduit and arranged such that the liquid will impinge upon the sharp edge as it flows through the conduit.

11. A system according to claim 1, including an ultrasound generating circuitry arrangement positioned one of upstream of and at the filtering device.

12. A system according to claim 11, wherein the circuitry arrangement is oriented in such a manner that a spreading direction of the generated ultrasound is essentially horizontal.

13. A filtering device for use in a system for the conduction of a liquid fuel between an inlet and a delivery point, said system comprising at least one of a fuel consumption measuring system and a fuel conditioning system, said filter device comprising a filter housing and a filtering element, present in a space therein, having a filtering surface through which the liquid medium flows, in which the filtering surface of the filtering element encloses an angle of less than 90° with vertical, wherein a connection at the housing for the liquid medium is positioned in a zone outside of the filtering element.

14. A filtering device according to claim 13, wherein the filtering surface is arranged vertically.

15. A filtering device according to claim 13, wherein the connection is positioned in a lowest zone of the filtering device, below the filtering element.

16. A filtering device according to claim 13, wherein the filtering element is constructed as an essentially annular cylindrical body, the filtering surface of which lies on an outer circumference of the cylinder and an axis of the cylinder encloses an angle of less than 90° with vertical.

17. A filtering device according to claim 13, wherein the connection is arranged radially spaced from a center axis of the filtering element.

18. A filtering device according to claim 13, wherein the filter housing above the filtering element includes a hollow space as a bubble-collecting volume which communicates with the space containing the filtering element.

19. A filtering element according to claim 18, wherein the hollow space is constructed as a bulge of the space containing the filtering element.

20. A filtering element according to claim 18, wherein a filling-state display is arranged in communication with the hollow space.

21. A filtering element according to claim 13, wherein a bubble-removing opening is provided at the hollow space.

22. A filtering element according to claim 21, wherein the bubble-removing opening is provided with an automatic bubble-removing device.

23. A system according to claim 1, wherein the filtering element is constructed as an essentially annular cylindrical body, the filtering surface of which lies on an outer circumference of the cylinder and an axis of the cylinder encloses an angle of less than 90° with vertical.

* * * * *